Figure 1:
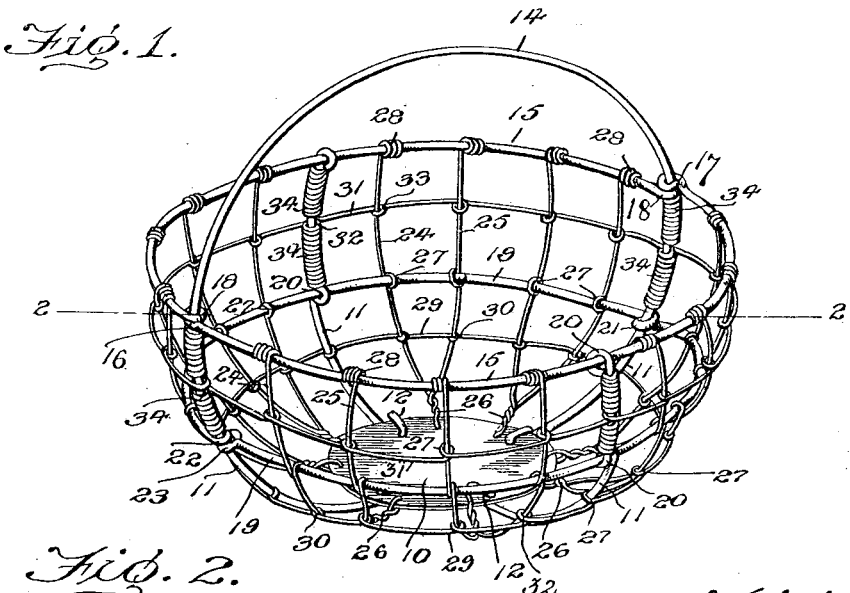

C. H. CLARK.
BASKET.
APPLICATION FILED JAN. 25, 1913.

1,137,698. Patented Apr. 27, 1915.

Inventor
C. H. Clark.

Witnesses

By
Attorneys.

UNITED STATES PATENT OFFICE.

CHARLES H. CLARK, OF EASTON, MAINE, ASSIGNOR OF ONE-THIRD TO DOMINIQUE PELLETIER, OF FORT KENT, MAINE.

BASKET.

1,137,698.  Specification of Letters Patent. Patented Apr. 27, 1915.

Application filed January 25, 1913. Serial No. 744,192.

*To all whom it may concern:*

Be it known that I, CHARLES H. CLARK, citizen of the United States, residing at Easton, in the county of Aroostook and State of Maine, have invented certain new and useful Improvements in Baskets, of which the following is a specification.

This invention relates to improvements in baskets, more particularly to baskets for gathering fruit, vegetables and the like, and has for one of its objects to produce a basket constructed wholly of metal and including sides formed of wire having the meshes or spaces between the parts sufficiently large to permit earth and other extraneous matter to sift through, leaving the fruit or vegetables in the basket.

Another object of the invention is to provide a basket having an imperforate supporting bottom, a relatively heavy wire frame including a handle, and interlacing and interlocking intermediate members and connected to the imperforate bottom.

Another object of the invention is to provide a basket including a frame of relatively heavy wire and with intermediate members interlocking with each other and interlocking with the heavy frame members, and with spacer devices maintaining the parts in separated position.

With these and other objects in view the invention consists in certain novel features of construction as hereinafter shown and described and then specifically pointed out in the claim, and in the drawings illustrative of the preferred embodment of the invention.

Figure 2:
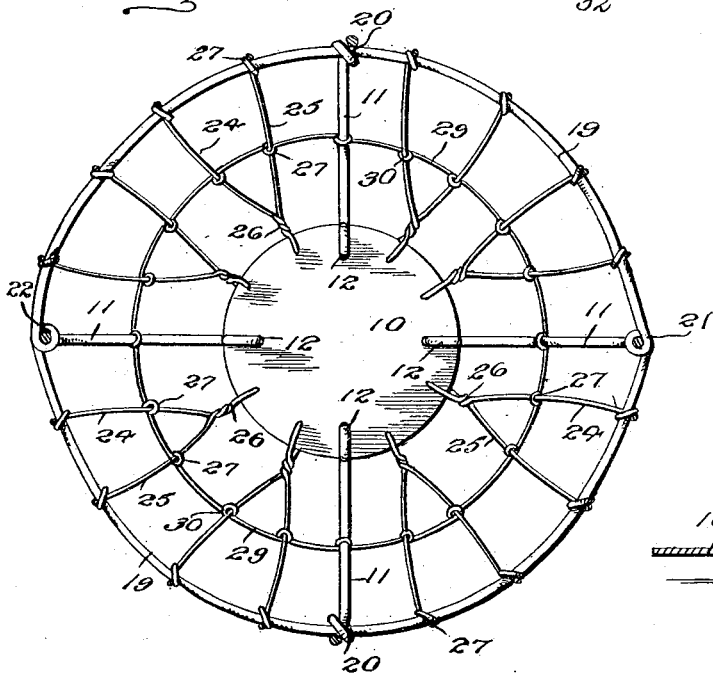
Figure 3:
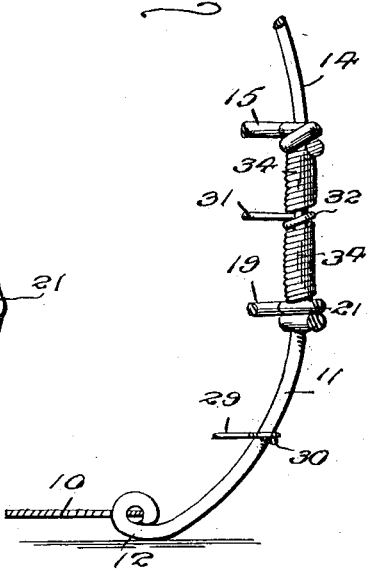

Figure 1 is a perspective view of the improved basket. Fig. 2 is a transverse section on the line 2—2 of Fig. 1. Fig. 3 is an enlarged sectional detail.

Corresponding and like parts are referred to in the following description and indicated in all the views of the drawings by the same reference characters.

The improved device is constructed wholly of metal and comprises an imperforate bottom member 10 of heavy sheet metal and of any required size or weight.

The frame of the basket comprises a plurality of ribs of relatively heavy wire and represented as a whole at 11 and extending beneath the bottom plate 10 and extended upwardly through an aperture in the plate and bent over in the shape of an eye 12, as shown. The ribs 11 curve outwardly and upwardly to conform to the outline of the basket. The lower portion 12 of the ribs is thus directed below the line of the plate 10 and protects the latter so that when the basket is located upon the ground or other supporting body the projecting portions 12 of the ribs receive the weight and thus protect the plate 10.

Any required number of the ribs may be employed, but generally four will be sufficient as shown and one opposite pair of the ribs is extended into a handle 14. The upper rim of the basket is formed of a rod 15 of relatively heavy wire and coiled intermediate its ends at 16 around one of the ribs, preferably the ribs which are extended into the handle 14, and the terminals of the rod coiled at 17—18 around the opposite rib. An intermediate stay member represented as a whole at 19 extends around the frame of the basket and the intermediate or shorter ribs 11 are coiled at 20 around the member 19 while the member 19 is coiled around one of the handle ribs 11 as shown at 21 and with the terminals bent into eyes 22—23 and engaging around the opposite handle rib 11. By this means it will be noted that the eyes 17—18 are at one side of the basket while the eyes 22—23 are at the opposite side of the basket. By this means a very strong and durable frame is produced which is capable of resisting the severe strains to which devices of this character are subjected when in use. An intermediate body formed of relatively light wire is connected between the members 15—19 and the members 11 and comprises a plurality of strips of wire bent into U-form whereby spaced side members 24—25 are produced and passed by their "bight" or bends through apertures in the plate 10 and the sides twisted as represented at 26. The side members 24—25 are then coiled as shown at 27 around the member 19 and likewise coiled as shown at 28 around the member 15. The sides 24—25 as will be noted diverge from the twist 26 to the member 19 and thence extend in parallel relations to the member 15. Any required number of the members 24—25 may be employed, the members being spaced sufficiently near together to form a mesh small enough to prevent potatoes and other vegetables from passing between the parts, while at the same time permitting the dirt and other extraneous matter to pass. The sides 24—25 are connected between the members 10 and 19 by one or more strands of wire 29 which are coiled at 30 around the members 11 and likewise around the members 24—25. One or more strands 31 are likewise connected between the members 15 and 19 and coiled around the members 11 as shown at 32 and likewise coiled around the members 24—25 as shown at 33. By this means a body formed of wire members is produced which fills the space between the members 11 and between the members 10 and 15. The members 24—25 and the members 29—31 are so spaced as to form the body into relatively small intricacies of substantially uniform size and thus completes the contour of the basket. Coiled around the members 11 between the members 15 and 19 are closely engaging coils of wire 34 which form spacers to maintain the members 15—19 in proper spaced relations and prevent the collapsing of the members and likewise prevent the displacement of the strand 31.

The improved device is simple in construction, can be formed of any required size and with any required number of the frame and strand members and form a body with the interstices between the members of any required size to adapt the device to vegetables and fruits of various sizes.

In the gathering of vegetables, more particularly potatoes and other vegetables which grow beneath the surface of the ground, the earth adheres thereto, but by employing the improved basket the adhering earth is shaken loose and falls through the interstices of the body leaving the vegetables free from earth and other extraneous matter and ready to be deposited at once in the bins or other receiving inclosures and without increasing the labor of gathering the vegetables, as the separation of the earth from the vegetables is accomplished automatically when they are thrown into the basket. Where the earth clings to the vegetables it can readily be separated by slightly shaking the basket as the vegetables are deposited therein, which action does not entail material additional labor.

The members comprising the basket may be galvanized, japanned, or otherwise coated to prevent corrosion.

Having thus described the invention, what is claimed is:

In a basket, a bottom member, an annular top member, a plurality of vertical rib members of relatively heavy material spaced apart and connecting the bottom member with the top member, a horizontal rib member of relatively heavy material connected to the vertical rib members intermediate their ends, a plurality of web members of relatively light material connected to the bottom and top members and to the rib members, and spacer members surrounding the vertical rib members between the top member and the horizontal rib member.

In testimony whereof I affix my signature in presence of two witnesses.

CHARLES H. CLARK. [L. S.]

Witnesses:
NATHAN F. PERRY,
FLORANCE M. CLARK.

Copies of this patent may be obtained for five cents each, by addressing the "Commissioner of Patents, Washington, D. C."